US011204109B2

(12) United States Patent
Vaccaro et al.

(10) Patent No.: US 11,204,109 B2
(45) Date of Patent: Dec. 21, 2021

(54) GROMMET FOR HOLDING CABLES

(71) Applicant: CommScope Technologies LLC, Hickory, NC (US)

(72) Inventors: Ronald A. Vaccaro, Taylorsville, NC (US); Aviral Joshi, Chicago, IL (US); Christopher Stockman, Bella Vista, AR (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/521,125

(22) Filed: Jul. 24, 2019

(65) Prior Publication Data

US 2020/0041042 A1 Feb. 6, 2020

Related U.S. Application Data

(60) Provisional application No. 62/712,637, filed on Jul. 31, 2018.

(51) Int. Cl.
*F16L 3/137* (2006.01)
*H02G 3/32* (2006.01)

(52) U.S. Cl.
CPC ............... *F16L 3/137* (2013.01); *H02G 3/32* (2013.01)

(58) Field of Classification Search
USPC ......................................................... 248/49
See application file for complete search history.

(56) References Cited

U.S. PATENT DOCUMENTS

| | | | | | |
|---|---|---|---|---|---|
| 2,922,836 | A | * | 1/1960 | Brown | H02G 3/088 277/606 |
| 3,123,879 | A | * | 3/1964 | Boduroff | E04C 5/122 403/217 |
| 3,518,358 | A | * | 6/1970 | Brown | H02G 15/043 174/138 F |
| 3,562,847 | A | * | 2/1971 | Jemison | H02G 3/083 16/2.1 |
| 3,984,623 | A | * | 10/1976 | Worden | H02G 15/04 174/138 F |
| 4,715,571 | A | * | 12/1987 | Soltow | F16L 3/22 174/146 |
| 4,717,792 | A | * | 1/1988 | Sterritt | H02G 15/013 174/88 C |
| 4,857,672 | A | * | 8/1989 | Rebers | H02G 15/013 174/93 |
| 5,214,248 | A | * | 5/1993 | Jamison | H02G 15/113 174/41 |

(Continued)

*Primary Examiner* — Monica E Millner
(74) *Attorney, Agent, or Firm* — Myers Bigel, P.A.

(57) ABSTRACT

The present disclosure describes grommets formed of a polymeric material and adapted for holding a plurality of discrete cables. The grommet comprises a main body having a generally c-shaped outer profile surrounding an interior cavity, the main body further having a length, thickness, and a longitudinal axis extending between two ends, a plurality of cable holding members integrally coupled to the main body and extending radially inward from the main body, the cable holding members defining a plurality of receptacles located within the interior cavity of the main body, and a plurality of flex retention sections coupled to the cable holding members and located within each receptacle, wherein the flex retention sections are adapted for gripping a cable.

21 Claims, 3 Drawing Sheets

(56) References Cited

U.S. PATENT DOCUMENTS

| | | | | |
|---|---|---|---|---|
| 5,443,232 A * | 8/1995 | Kesinger | ............... | H02G 3/263 |
| | | | | 248/62 |
| 5,645,456 A * | 7/1997 | Petersen | ............... | H01R 9/03 |
| | | | | 439/724 |
| 6,354,543 B1 * | 3/2002 | Paske | ............... | F16L 3/12 |
| | | | | 211/85.18 |
| 6,936,770 B2 * | 8/2005 | Takedomi | ............... | F16L 5/10 |
| | | | | 16/2.1 |
| 7,442,884 B2 * | 10/2008 | Ball | ............... | H02G 15/013 |
| | | | | 16/2.1 |
| 7,546,985 B1 * | 6/2009 | Choi | ............... | F16L 3/245 |
| | | | | 248/49 |
| D691,877 S * | 10/2013 | Ganski | ............... | D8/356 |
| 9,306,380 B2 | 4/2016 | Vaccaro | | |
| 9,407,078 B2 * | 8/2016 | Budagher | ............... | H02G 3/32 |
| 9,438,021 B2 * | 9/2016 | Crounse | ............... | H02G 3/32 |
| D778,143 S * | 2/2017 | Crounse | ............... | D8/356 |
| 9,866,004 B2 | 1/2018 | Vaccaro | | |
| 9,903,510 B2 | 2/2018 | Joshi | | |
| 9,983,378 B2 * | 5/2018 | Vaccaro | ............... | F16L 3/137 |
| 2002/0066833 A1 * | 6/2002 | Ferrill | ............... | H02G 3/32 |
| | | | | 248/62 |
| 2003/0010519 A1 * | 1/2003 | Pieck | ............... | G02B 6/4471 |
| | | | | 174/659 |
| 2012/0292460 A1 * | 11/2012 | Hsu | ............... | H02G 7/053 |
| | | | | 248/70 |
| 2012/0308189 A1 * | 12/2012 | Kimbrell | ............... | G02B 6/4471 |
| | | | | 385/135 |
| 2013/0106060 A1 * | 5/2013 | Beele | ............... | F16J 15/02 |
| | | | | 277/314 |

\* cited by examiner

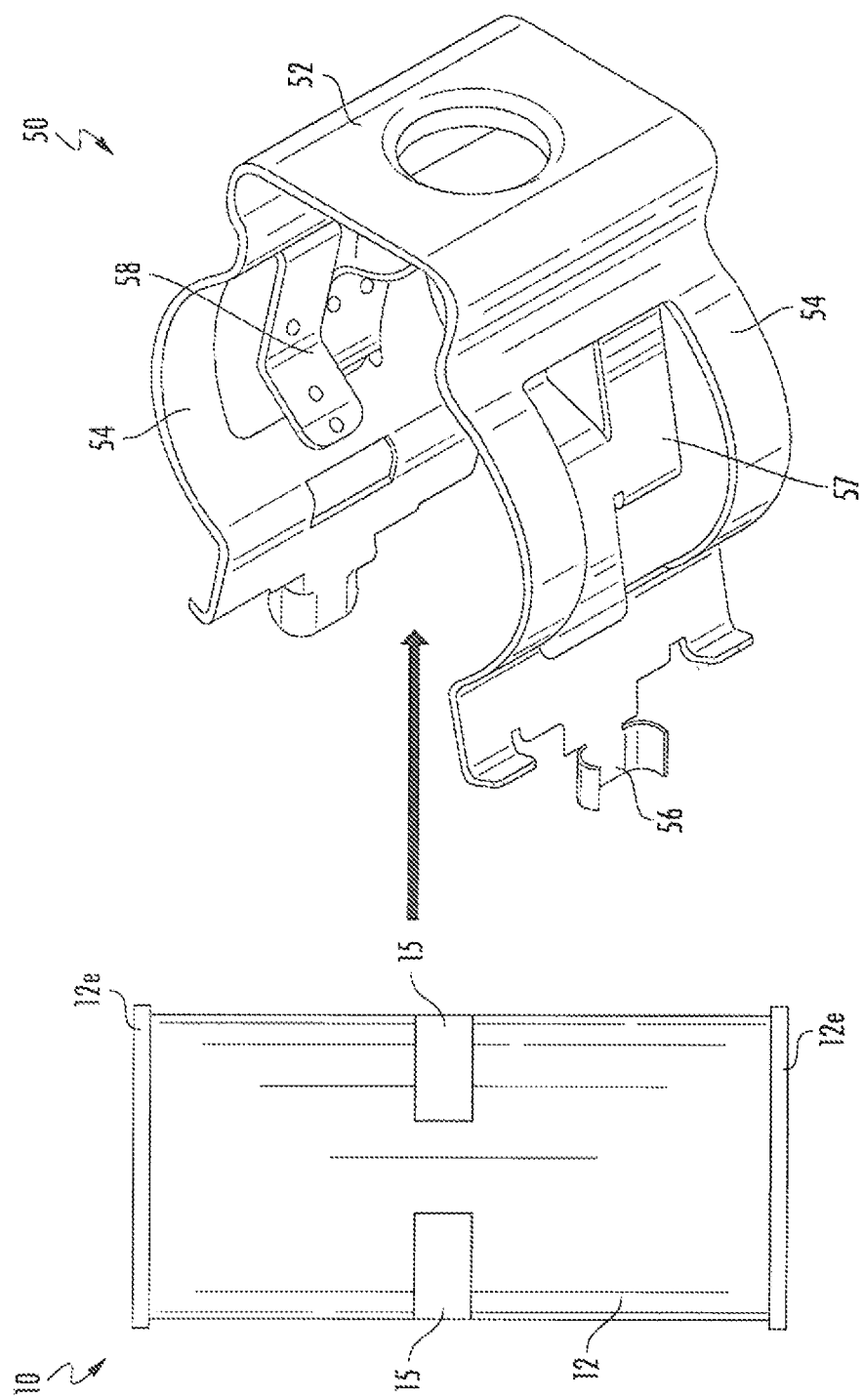

GROMMET FOR HOLDING CABLES

RELATED APPLICATION(S)

The present application claims priority from and the benefit of U.S. Provisional Application No. 62/712,637, filed Jul. 31, 2018, the disclosure of which is hereby incorporated herein in its entirely.

FIELD OF THE INVENTION

The invention relates to a grommet for holding cables.

BACKGROUND OF THE INVENTION

Until recently, antenna towers have typically employed RF coaxial cables for power and/or signal communications. Such cables are often mounted to the tower via cable hangers, which capture the cable and mount it to the tower. One popular variety of cable hanger is a "stackable" hanger, which has the capacity to mount via snap latches to another hanger, thereby enabling multiple cables to be mounted in a "stack"; an exemplary stackable hanger is the Snap-Stak hanger, available from CommScope, Inc. (Joliet, Ill.). Snap-in hangers are often desirable due to their ease of use, although cable hangers that are not stackable are often employed also.

Operators have begun to replace traditional RF cables on towers with fiber optic and/or hybrid fiber/power cables. These new cables (especially the hybrid styles) can have a slightly irregular shape. Also, fiber optic and hybrid fiber/power cables are typically heavy (in some instances three to four times the weight per unit length of traditional RF cable). In addition to being of a slightly irregular shape, the diameter over-jacket (DOJ) of a cable can be vastly different from traditional RF cables.

As a result, in practice some operators use standard hangers in combination with grommets to hang fiber or hybrid fiber cable. The grommets are a fairly soft polymer (e.g., EPDM, nylon, or the like). The outer diameter of the grommet may be sized to fit in the hanger, whereas the inner diameter is configured to grip the fiber/hybrid fiber cable. In some grommets, multiple holes are included to accommodate multiple cables (e.g., fiber, power, signal, etc.). However, the grummets may be sized poorly for the cables they receive and/or may slip from the hanger. As such, modifications to improve the holding of cables via such grommets may be desirable.

SUMMARY OF THE INVENTION

A first aspect of the present invention is directed to a grommet formed of a polymeric material and adapted for holding a plurality of discrete cables. The grommet comprises a main body having a generally c-shaped outer profile surrounding an interior cavity. The main body further has a length, thickness, and a longitudinal axis extending between two ends. A plurality of cable holding members may be integrally coupled to the main body and may extend radially inward from the main body. The cable holding members define a plurality of receptacles located within the interior cavity of the main body. A plurality of flex retention sections may be coupled to the cable holding members and located within each receptacle. The flex retention sections are adapted for gripping a cable.

Another aspect of the present invention is directed to a grommet formed of a polymeric material and adapted for holding a plurality of discrete cables. The grommet comprises a main body having a generally c-shaped outer profile surrounding an interior cavity. The main body further has a length, thickness, and a longitudinal axis extending between two ends. A plurality of cable holding members may be integrally coupled to the main body and may extend radially inward from the main body. The cable holding members define a plurality of receptacles located within the interior cavity of the main body. Each respective receptacle is sized to hold a cable having a different diameter.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the an from a reading of the figures and the detailed description of the preferred embodiments that follow, such description being merely illustrative of the present invention.

BRIEF DESCRIPTION OP THE DRAWINGS

FIG. 4 is an exploded perspective view showing the grommet of FIGS. 1A-1D in combination with a cable hanger.

DETAILED DESCRIPTION OF THE INVENTION

Figure 1A:
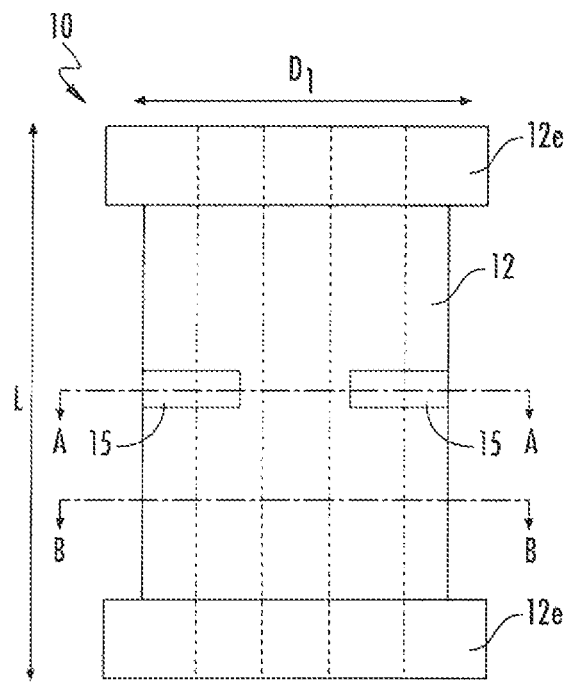
FIG. 1A is a side view of a grommet according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Figure 1B:
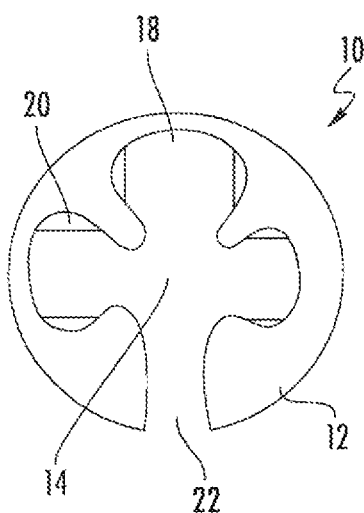
FIG. 1B is a top view of the grommet of FIG. 1A.
Figure 1C:
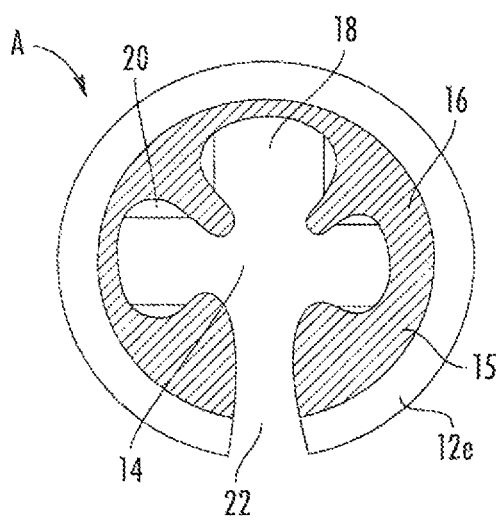
FIG. 1C is a section view of the grommet of FIG. 1A taken along section line A-A.
Figure 1D:
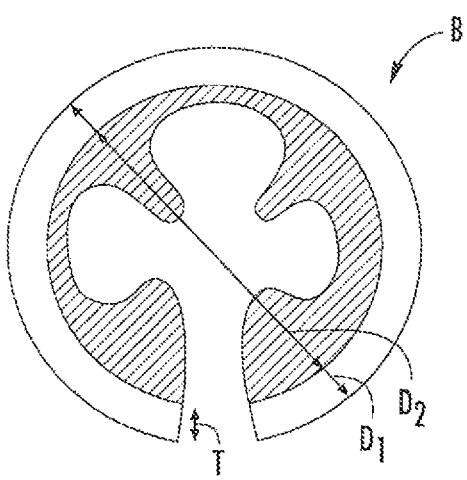
FIG. 1D is a section view of the grommet of FIG. 1A taken along section line B-B.
Figure 2:
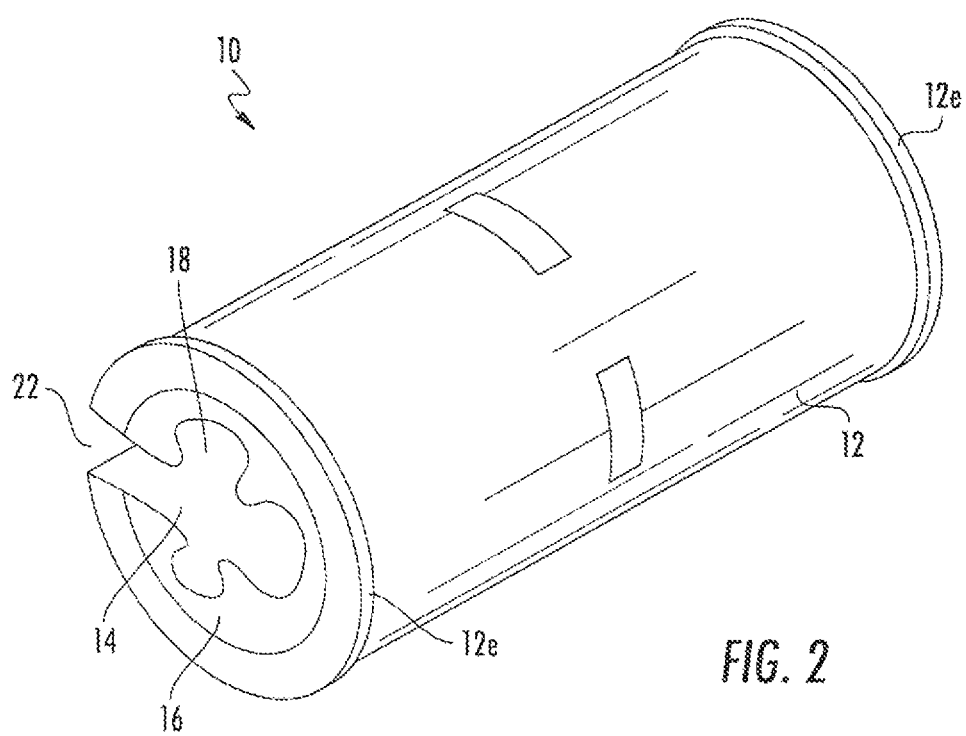
FIG. 2 is a front perspective view of the grommet of FIGS. 1A-1D.
Figure 3:
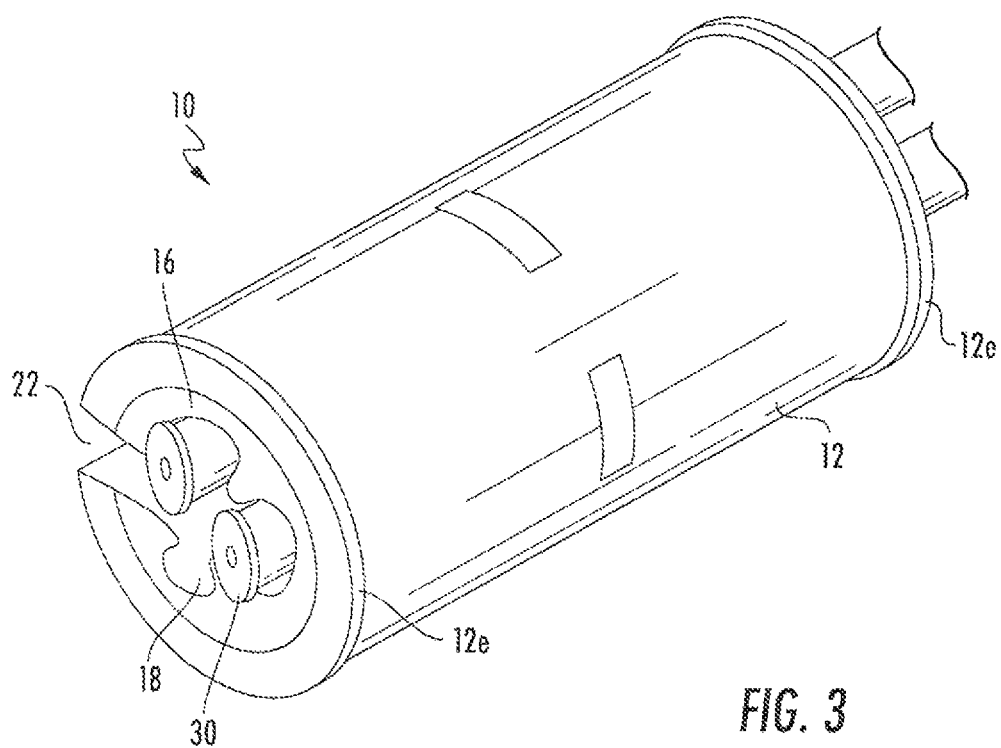
FIG. 3 is a front perspective view illustrating the grommet of FIGS. 1A-1D holding a plurality of cables having different diameters.

Referring now to the figures, a grommet 10 according to some embodiments of the present invention is illustrated in FIGS. 1-3. The grommet 10 may be formed of a polymeric material and is adapted for holding a plurality of discrete cables 30 (see, e.g., FIG. 3). Exemplary types of cables 30 that may be held together using a grommet 10 of the present invention include, but are not limited to, fiber optic cables and hybrid fiber/power cables. In some embodiments, the polymeric material forming the grommet 10 may comprise rubber, polypropylene, polyethylene, ethylene propylene diene monomer (EPDM) rubber, silicone or the like.

As shown in FIGS. 1A-1D, a grommet 10 of the present invention comprises a main body 12 having two ends 12e. The main body 12 surrounds an interior cavity 14. In some embodiments, the ends 12e may protrude radially outwardly from the main body 12. The protruding ends 12c can provide additional stability when the grommet 10 is used with a cable hanger (see, e.g., FIG. 4). In some embodiments, the main body 12 may have a generally c-shaped outer profile that surrounds the interior cavity 14. In some embodiments, the main body 12 may have an outer profile shape other than c-shaped, such as, for example, cylindrical, elliptical, hexagonal or square in profile.

The main body 12 of the grommet 10 has a length (L), a thickness (T), and a longitudinal axis defined by its length dimension (FIG. 1A). The main body 12 may have a diameter ($D_1$) (at the ends 12e) and a diameter ($D_2$) in the center (FIG. 1D). The diameters ($D_1$, $D_2$) of the main body 12 can vary depending on the diameter(s) of the cables 30 being held together. In some embodiments, the main body 12 has an inner diameter ($D_2$) from about 12 mm to about 50 mm. In some embodiments, the main body 12 has an outer diameter ($D_1$) from about 18 mm to about 60 mm. In some embodiments, the main body 12 can have a length (L) from about 25 mm to about 70 mm.

The grommet 10 of the present invention may comprise a plurality of cable holding members 16. In some embodiments, the plurality of cable holding members 16 may be integrally coupled to the main body 12 of the grommet 10 and extend radially inwardly from the main body 12. In some embodiments, the cable holding members 16 may be of a generally constant cross-section along the longitudinal axis of the main body 12 (as seen in FIGS. 1B-1D), and may extend the entire length (L) of the grommet 10.

The plurality of cable holding members 16 may define a plurality of receptacles 18 residing within the interior cavity 14 of the main body 12. The receptacle 18 of each cable holding member 16 has a nominal diameter sufficient to hold a cable 30. In some embodiments, the receptacles 18 have nominal diameters sufficient to hold cables 30 having diameters of about 1 mm to about 35 mm. In some embodiments, each respective receptacle 18 is sized to hold cables 30 having the same diameter. In other embodiments, each respective receptacle 18 is sized to hold cables 30 having different diameters. In some embodiments, at least two (and in the illustrated embodiment, three) receptacles 18 are sized to each hold cables 30 having different diameters. For example, one receptacle 18 may be sized for a 1 mm cable, another receptacle 18 may be sized for a 15 mm cable, and a third receptacle 18 may be sized for a 25 mm cable.

As shown in FIG. 1B and FIG. 1C, in some embodiments, the grommet 10 may comprise a plurality of flex retention sections 20. The flex retention sections 20 may be coupled to the cable holding members 16 and located within each receptacle 18. The flex retention sections 20 (which are in essence a beam with fixed ends) are adapted for gripping a cable 30 when the cable 30 is placed within a receptacle 18. For example, the flex retention sections 20 may be formed of a polymeric material which gives the flex retention sections 20 a certain degree of flexibility. This flexibility allows the flex retention sections 20 to deflect to enable insertion of a cable 30 within a receptacle 18. Once a cable 30 is positioned within a receptacle 18, the resilient nature of the polymeric material allows the flex retention sections 20 to recover, thereby gripping the cable 30 and securing the cable 30 within the receptacle 18. In some embodiments, the polymeric material forming the flex retention sections 20 may comprise rubber, polypropylene, polyethylene, ethylene propylene diene monomer (EPDM) rubber, silicone, or the like.

In some embodiments, cable holding members 16 of the grommet 10 may have open spaces 15 (or "windows") (see, e.g., FIG. 1A). These open windows 15 may provide space for the flex retention sections 20 to deflect into when a cable 30 is secured within the receptacle 18. This can allow the receptacles 18 to secure a larger range of cable 30 diameters, as well as improve the ease of installation of the cables 30.

The main body of the grommet 10 may have a slot 22 extending along its length (L). The slot 22 provides an entry point for the cables 30 to be inserted into the interior cavity 14 of the grommet 10 and placed into a respective receptacle 18. Similar to the flex retention sections 20, in some embodiments, the polymeric material that forms the grommet 10 gives the grommet 10 a certain degree of flexibility, such that the grommet 10 may be deflected to an open position to enable insertion of the cables 30. Once the cables 30 are positioned within the receptacles 18 of the grommet 10, the resilient nature of the polymeric material allows the grommet 10 to recover to its original size, thereby securing the cables 30 within the grommet 10.

As mentioned above, and illustrated in FIG. 3, a grommet 10 of the present invention may hold at least two cables 30, wherein each cable has a different diameter. FIG. 3 shows the grommet 10 with a plurality of discrete cables 30 held together, each cable 30 being held within a receptacle 18. Each cable 30 fits within the receptacle 18 sized for that cable 30. As discussed above, the flex retention sections 20 of each receptacle 18 can provide additional grip, i.e., surface friction with the cables 30, thereby reducing movement and providing security of the cables 30.

Referring now to FIG. 4, in some embodiments, a grommet 10 of the present invention may be used in combination with a cable hanger 50. Coaxial cables for power and/or signal communications are often mounted to a foundation structure, e.g., an antenna tower, via cable hangers 50, which capture the cable 30 and mount it to the structure. The cable hanger 50 may include a generally C-shaped body 52 having two opposable arms 54. The opposable arms 54 may have latches 56 that extend away from the cable hanger body 52. In some embodiments, the cable hanger 50 may be dimensioned to receive a grommet 10 of the present invention such that the grommet 10 can be held between the opposable arms 54 of the cable hanger 50, with the ends 12e of the grommet 10 engaging the upper and lower edges of the cable hanger 50. Some cable hangers 50 may have flex members 57 with gripping members 58. Exemplary cable hangers 50 are shown in U.S. Pat. No. 9,306,380 to Vaccaro, U.S. Pat. No. 9,866,004 to Vaccaro et al., and U.S. Pat. No. 9,903,510 to Joshi et al., each, of which are incorporated by reference in their entirety herein. The combination of the grommet 10 and cable hanger 50 can be mounted to the foundation structure via the latches 56, often into mounting holes having a nominal 0.75 inch diameter.

Grommets 10 of the present invention may be formed by manufacturing methods known in the art, such as, for example, injection molding or the like.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A grommet formed of a polymeric material and adapted for holding a plurality of discrete cables, the grommet comprising:
a main body having a generally c-shaped outer profile surrounding an interior cavity, the main body further having a length, thickness, and a longitudinal axis extending between two ends;
a plurality of cable holding members integrally coupled to the main body and extending radially inward from the main body, the cable holding members defining a plurality of receptacles located within the interior cavity of the main body; and
a plurality of flex retention sections coupled to the cable holding members and located within each receptacle of the plurality of receptacles, wherein each flex retention section of the plurality of flex retention sections comprises a beam with fixed ends and is adapted for gripping a respective cable of the plurality of discrete cables.

2. The grommet of claim 1, wherein the two ends protrude radially outwardly from the main body.

3. The grommet of claim 1, wherein the plurality of cable holding members are of a generally constant cross-section along the longitudinal axis of the main body.

4. The grommet of claim 1, wherein the grommet is formed by injection molding.

5. The grommet of claim 1, wherein the polymeric material comprises rubber, polypropylene, polyethylene, ethylene propylene diene monomer (EPDM) rubber, and/or silicone.

6. The grommet of claim 1, in combination with the plurality of discrete cables, each cable residing within a respective receptacle.

7. The grommet of claim 1, wherein the plurality of discrete cables comprises cables selected from a group consisting of fiber optic cables and hybrid fiber/power cables.

8. The grommet of claim 1, in combination with a cable hanger, wherein the cable hanger has opposable arms, and wherein the grommet is held between the opposable arms.

9. The grommet of claim 1, wherein the main body has a length of about 25 mm to about 70 mm.

10. The grommet of claim 1, wherein the main body has a diameter of about 12 mm to about 50 mm.

11. The grommet of claim 1, wherein the plurality of cable holding members have a diameter sufficient to hold cables having diameters of about 1 to about 35 mm.

12. The grommet of claim 1, wherein at least two of the receptacles are sized to hold cables of different diameters.

13. The grommet of claim 1, in combination with at least two cables, wherein each cable has a different diameter.

14. A grommet formed of a polymeric material and adapted for holding a plurality of discrete cables, the grommet comprising:
a main body having a generally c-shaped outer profile surrounding an interior cavity, the main body further having a length, thickness, and a longitudinal axis extending between two ends;
a plurality of cable holding members integrally coupled to the main body and extending radially inward from the main body, the cable holding members defining a plurality of receptacles located within the interior cavity of the main body, each respective receptacle sized to hold a cable having a different diameter; and
a plurality of flex retention sections coupled to the cable holding members and located within each of the plurality of receptacles, wherein each of the plurality of flex retention sections is adapted for gripping a cable,
wherein the main body comprises apertures that correspond to a respective flex retention section of the plurality of flex retention sections and provide a space for the respective flex retention section to deflect into when a respective cable of the plurality of discrete cables is secured within a respective receptacle of the plurality of receptacles.

15. The grommet of claim 14, in combination with the plurality of discrete cables, each cable residing within a respective receptacle of the plurality of receptacles.

16. The grommet of claim 14, wherein the plurality of cable holding members are of a generally constant cross-section along the longitudinal axis of the main body.

17. The grommet of claim 14, wherein the plurality of cable holding members have a diameter sufficient to hold cables having diameters of about 1 to about 35 mm.

18. The grommet of claim 14, wherein the polymeric material comprises rubber, polypropylene, polyethylene, ethylene propylene diene monomer (EPDM) rubber and/or silicone.

19. The grommet of claim 14, wherein the grommet is formed by injection molding.

20. The grommet of claim 14, wherein the two ends protrude radially outwardly from the main body.

21. The grommet of claim 1, wherein the main body comprises apertures that correspond to a respective flex retention section and provide a space for the flex retention sections to deflect into when a cable is secured within a respective receptacle.

* * * * *